(12) United States Patent
Schnase et al.

(10) Patent No.: US 9,411,569 B1
(45) Date of Patent: Aug. 9, 2016

(54) SYSTEM AND METHOD FOR PROVIDING A CLIMATE DATA ANALYTIC SERVICES APPLICATION PROGRAMMING INTERFACE DISTRIBUTION PACKAGE

(71) Applicant: The United States of America represented by the Administrator of the National Aeronautics and Space Administration, Washington, DC (US)

(72) Inventors: John L. Schnase, Laurel, MD (US); Daniel Q. Duffy, Gambrillis, MD (US); Glenn S. Tamkin, Silver Spring, MD (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 14/710,312

(22) Filed: May 12, 2015

(51) Int. Cl.
*G06F 9/445* (2006.01)

(52) U.S. Cl.
CPC ........................................ *G06F 8/60* (2013.01)

(58) Field of Classification Search
CPC ................ G06F 8/60; G06F 8/61; G06F 8/65
See application file for complete search history.

(56) References Cited

U.S. PATENT DOCUMENTS

| 9,128,965 | B1* | 9/2015 | Yanacek | G06F 17/30292 |
| 2007/0219771 | A1* | 9/2007 | Verheyen | G06F 11/261 703/15 |
| 2008/0147675 | A1* | 6/2008 | Engehausen | G06F 8/60 |
| 2010/0251134 | A1* | 9/2010 | Van Seggelen | G06F 9/4443 715/744 |
| 2014/0156806 | A1* | 6/2014 | Karpistsenko | G06Q 50/28 709/219 |
| 2014/0207292 | A1* | 7/2014 | Ramagem | G05B 15/02 700/278 |
| 2014/0215450 | A1* | 7/2014 | Salisbury | G06F 8/65 717/170 |
| 2015/0186132 | A1* | 7/2015 | Oliveri | G06F 8/34 717/120 |

\* cited by examiner

*Primary Examiner* — Chameli Das

(57) ABSTRACT

A system, method and computer-readable storage devices for providing a climate data analytic services application programming interface distribution package. The example system can provide various components. The system provides a climate data analytic services application programming interface library that enables software applications running on a client device to invoke the capabilities of a climate data analytic service. The system provides a command-line interface that provides a means of interacting with a climate data analytic service by issuing commands directly to the system's server interface. The system provides sample programs that call on the capabilities of the application programming interface library and can be used as templates for the construction of new client applications. The system can also provide test utilities, build utilities, service integration utilities, and documentation.

11 Claims, 3 Drawing Sheets

SYSTEM AND METHOD FOR PROVIDING A CLIMATE DATA ANALYTIC SERVICES APPLICATION PROGRAMMING INTERFACE DISTRIBUTION PACKAGE

BACKGROUND

1. Technical Field

The present disclosure relates to providing access to climate data and more specifically to providing a distribution package whereby end users gain access to a climate data analytic services API, program samples, build utilities, and documentation.

2. Introduction

Climate models generate data that are of great value to society. Climate model outputs include retrospective analyses that model the historical state of the climate, estimates of current climate conditions, and projections of future climate conditions. Offering climate data analytics as a service makes it easier to access climate model data and perform data analyses where the data are stored. The capabilities of a climate data analytics service can be made available to client devices through an application programming interface. Currently, however, the ability of end users, applications, climate researchers, or members of the public to gain meaningful access to climate data analytic services is limited. The current technologies are deficient because there exists no effective means for gaining access to the libraries, utilities, and documentation that include an application programming interface. What is needed is an improved approach that makes it easier to access the capabilities of a climate data analytic services application programming interface.

DETAILED DESCRIPTION

A system, method and computer-readable storage devices are disclosed which deliver a climate data analytic services application programming interface to the end user. The climate data analytic services (CDS) application programming interface (API) distribution package provides an example embodiment of a system through which users can acquire the tools necessary to install and use the CDS API on a client device. Various modifications and changes may be made to this embodiment without departing from the broader spirit and scope of this disclosure.

Figure 1:
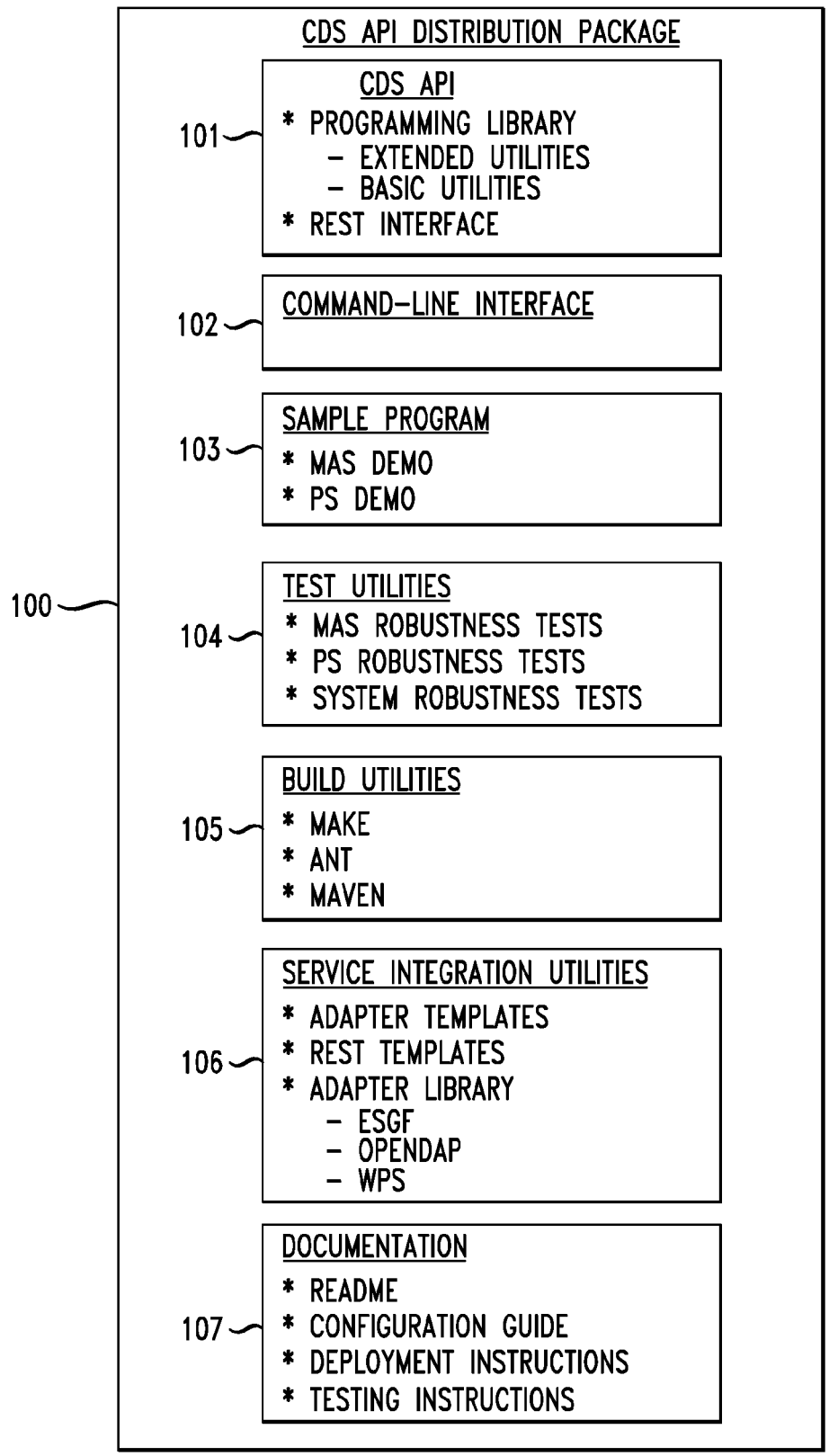
FIG. 1 illustrates an example climate data analytic services application programming interface distribution package.

FIG. 1 is a diagram showing an example CDS API distribution package. The example package can include a CDS API 101, a command-line interface (CLI) 102, sample programs 103, test utilities 104, build utilities 105, service integration utilities 106, and documentation 107. The CDS API 101 itself is a programming library containing basic and extended utilities and an API interface. The API interface can include an adapter module that maps the API's programming library utilities to the specific capabilities of a new service or legacy system, and a representational state transfer (REST) module that communicatively links the adapter module to a new service or legacy system Web service interface.

The command line interpreter 102 is a software application that enables users to interact directly with a climate data analytic system's interface. The CLI draws on the functionality of the CDS API programming library. In one embodiment, the CDS API supports a climate data analytics system including a MERRA analytic service (MAS) and a persistence service (PS). The distribution package provides sample programs 103 that demonstrate how a client software application can make use of the API libraries to access these services. In addition, the distribution package provides test utilities 104 that evaluate the robustness of the API runtime environment and libraries. As new services become available, the distribution package can be extended with sample programs and test routines for the new services. Build utilities 105 enable the end user to install and configure the API environment.

One goal for the distribution package is to make it easy for end users to install the CDS API and build CDS API-compliant software applications that use the capabilities afforded by systems that deliver climate data analytics as a service. An important complementary goal is to provide the tools necessary to integrate new services or legacy systems into the CDS API framework. To that end, the distribution package also provides service integration utilities 106 including templates for building CDS API-compliant interfaces to these systems.

Making a new service or legacy system accessible through the CDS API can include building an adapter module that maps the functionalities of the new service or legacy system to utilities in the API's programming library. The service integration utilities provide the tools and templates to guide the construction of such modules. In addition, a collection of pre-built adapter modules for commonly used systems, including the Earth System Grid Federation (ESGF), Open-Source Project for a Network Data Access Protocol (OpenDAP) services, and Open Geographic Consortium (OGC) Web Processing Service (WPS) services, are provided in the distribution package.

Finally, the CDS API distribution package can include all the documentation 107 needed to install, configure, test, and use the CDS API. The distribution package can be downloaded to a client device as an archive, such as a .zip file or a .tar file.

Figure 2:
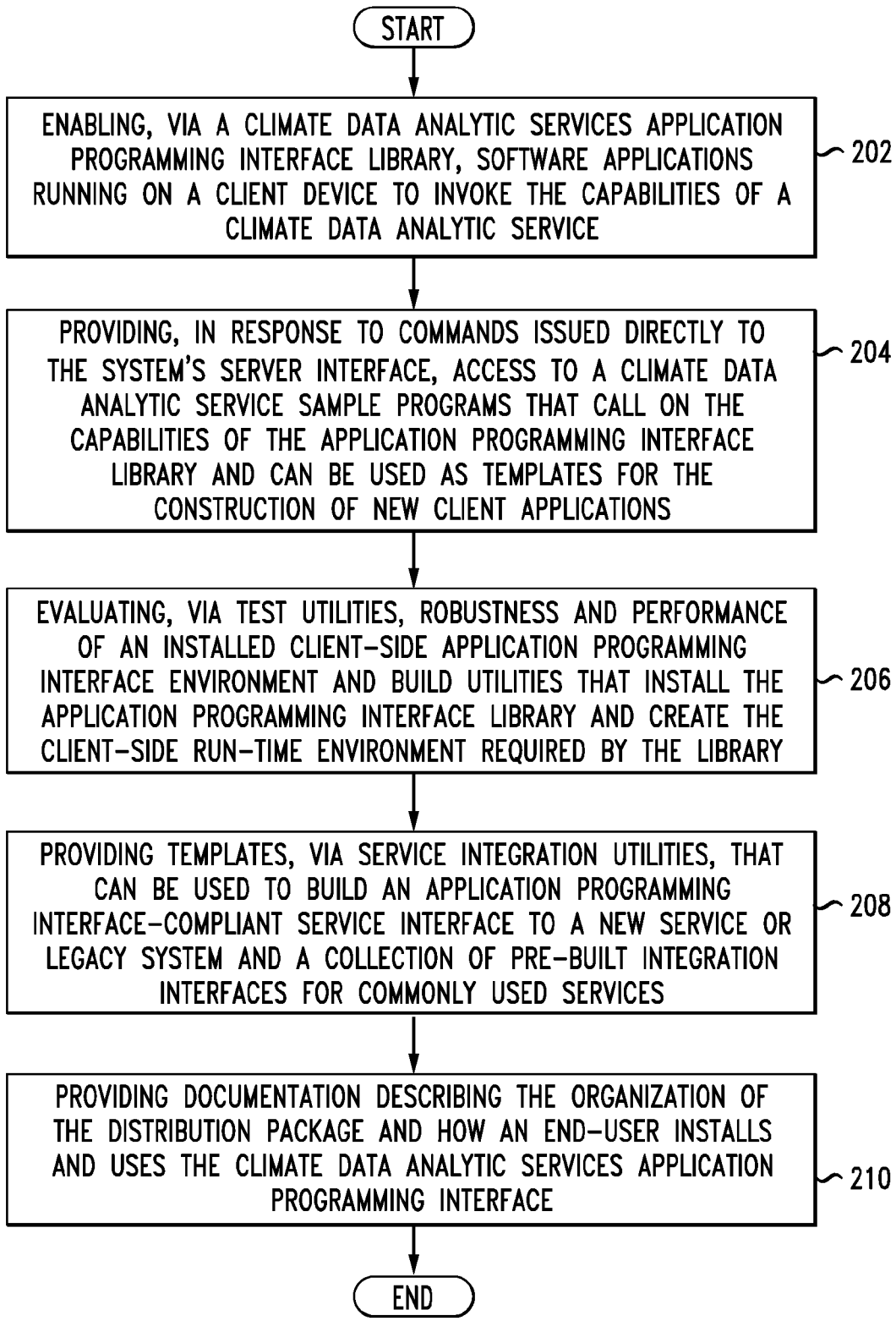
FIG. 2 illustrates an example method embodiment.

Having disclosed some basic system components and concepts, the disclosure now turns to the exemplary method embodiment shown in FIG. 2. For the sake of clarity, the method is described in terms of an exemplary system 100 as shown in FIG. 1 configured to practice the method. The steps outlined herein are exemplary and can be implemented in any combination thereof, including combinations that exclude, add, or modify certain steps.

A system 100 configured according to this disclosure can provide a climate data analytic services application programming interface distribution package. The system can include a climate data analytic services application programming interface (API) library that enables software applications running on a client device to invoke the capabilities of a climate data analytic service (202).

The system can include a command-line interface that provides a means of interacting with a climate data analytic service by issuing commands directly to the system's server interface (204). The system can include sample programs that call on the capabilities of the application programming interface library and can be used as templates for the construction of new client applications. The application programming interface library can be a set of Python programming language files containing the source code necessary to build and execute client-side applications. The sample programs can include a Python programming language application that demonstrates the use of the climate data analytic services application programming interface to automate data gathering from a climate data analytics service using the basic utilities of the service, a Python programming language application that demonstrates the use of the climate data analytic services application programming interface to automate data gathering from a climate data analytics service using the extended utilities of the service, and a Python programming language application that demonstrates the use of the climate data analytic services application programming interface to store a data object in a persistence service then add metadata, search, and download the object using the basic utilities of the persistence service. The API can communicate with a climate data analytics system's Web service interface through International Organization for Standards (ISO) Open Archival Information System (OATS) Reference Model-based uniform resource locators that include an ingest endpoint a general form, a query endpoint of a general form>, an order endpoint of the general form a download endpoint of a general form>, an execute endpoint of a general form>, , and a status endpoint of a general form.

The system can include test utilities that evaluate the robustness and performance of an installed client-side application programming interface environment (206), and build utilities that install the application programming interface library and create the client-side run-time environment required by the library. The build utilities can be tools such as Make, Ant, and Maven, which are trademarks of their respective owners. The test utilities can include a MERRA Analytic Services robustness test that exercises the basic utility methods of the service over various combinations of MERRA collections and variables, a persistence service robustness test that exercises the basic utility methods of the service with various combinations of operations, and a comprehensive system robustness test that exercises all methods of all services supported by the climate data analytic services application programming interface.

The system can include service integration utilities that provide templates that can be used to build an application programming interface-compliant service interface to a new service and a collection of pre-built integration interfaces for commonly used services (208). The service integration utilities can include specific adaptor modules for ESGF, OpenDAP services, and WPS services. The service integration library can include an adapter module that maps the API's programming library utilities to the specific capabilities of a new service or legacy system, and a REST module that communicatively links the adapter module to a new service or legacy system Web service interface. The adapter module can map climate data analytic service requests based on OAIS Reference Model data flow categories to various capabilities supported by the API's programming library. The capabilities of the adapter module can include ingest capabilities that input data objects to a service, query capabilities that retrieve metadata relating to data objects in a service, order capabilities that dynamically create data objects in a service, download capabilities that retrieve data objects from a service, execute capabilities that initiate service-definable operations, and status capabilities that check the progress of an order operation. The adapter and REST module templates can be made up of general software subroutine templates written in the Java, Python, and PHP programming languages. Java, Python, and PHP are trademarks of their respective owners.

The system can provide documentation describing the organization of the distribution package and how an end-user installs and uses the climate data analytic services application programming interface (210). The documentation can include, for example, a readme file that contains detailed configuration, deployment, and testing instructions.

Various embodiments of the disclosure are described in detail below. While specific implementations are described, it should be understood that this is done for illustration purposes only. Other components and configurations may be used without parting from the spirit and scope of the disclosure.

Figure 3:
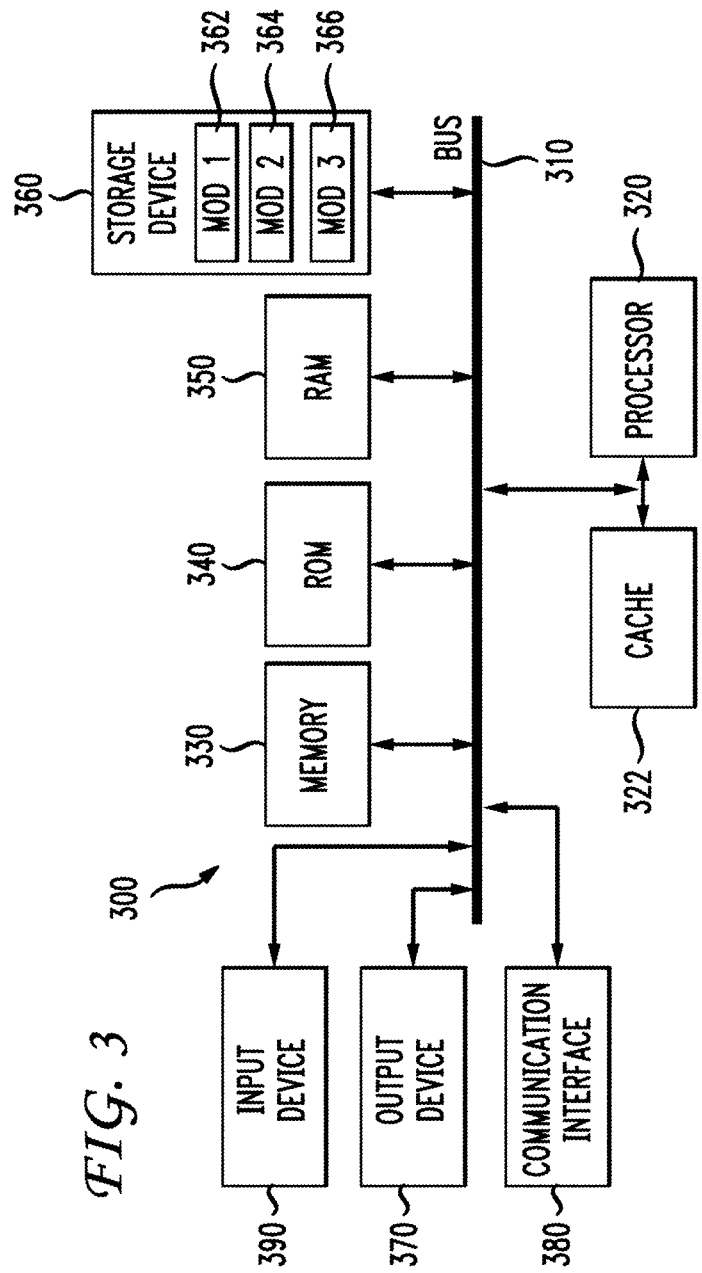
FIG. 3 illustrates an example system embodiment.

With reference to FIG. 3, an exemplary system and/or computing device 300 includes a processing unit (CPU or processor) 320 and a system bus 310 that couples various system components including the system memory 330 such as read only memory (ROM) 340 and random access memory (RAM) 350 to the processor 320. The system 300 can include a cache 322 of high-speed memory connected directly with, in close proximity to, or integrated as part of the processor 320. The system 300 copies data from the memory 330 and/or the storage device 360 to the cache 322 for quick access by the processor 320. In this way, the cache provides a performance boost that avoids processor 320 delays while waiting for data. These and other modules can control or be configured to control the processor 320 to perform various operations or actions. Other system memory 330 may be available for use as well. The memory 330 can include multiple different types of memory with different performance characteristics. It can be appreciated that the disclosure may operate on a computing device 300 with more than one processor 320 or on a group or cluster of computing devices networked together to provide greater processing capability. The processor 320 can include any general purpose processor and a hardware module or software module, such as module 1 362, module 2 364, and module 3 366 stored in storage device 360, configured to control the processor 320 as well as a special-purpose processor where software instructions are incorporated into the processor. The processor 320 may be a self-contained computing system, containing multiple cores or processors, a bus, memory controller, cache, etc. A multi-core processor may be symmetric or asymmetric. The processor 320 can include multiple processors, such as a system having multiple, physically separate processors in different sockets, or a system having multiple processor cores on a single physical chip. Similarly, the processor 320 can include multiple distributed processors located in multiple separate computing devices, but working together such as via a communications network. Multiple processors or processor cores can share resources such as memory 330 or the cache 322, or can operate using independent resources. The processor 320 can include one or more of a state machine, an application specific integrated circuit (ASIC), or a programmable gate array (PGA) including a field PGA.

The system bus 310 may be any of several types of bus structures including a memory bus or memory controller, a peripheral bus, and a local bus using any of a variety of bus architectures. A basic input/output (BIOS) stored in ROM 340 or the like, may provide the basic routine that helps to transfer information between elements within the computing device 300, such as during start-up. The computing device 300 further includes storage devices 360 or computer-readable storage media such as a hard disk drive, a magnetic disk drive, an optical disk drive, tape drive, solid-state drive, RAM drive, removable storage devices, a redundant array of inexpensive disks (RAID), hybrid storage device, or the like. The storage device 360 can include software modules 362, 364, 366 for controlling the processor 320. The system 300 can include other hardware or software modules. The storage device 360 is connected to the system bus 310 by a drive interface. The drives and the associated computer-readable storage devices provide nonvolatile storage of computer-readable instructions, data structures, program modules and other data for the computing device 300. In one aspect, a hardware module that performs a particular function includes the software component stored in a tangible computer-readable storage device in connection with the necessary hardware components, such as the processor 320, bus 310, display 370, and so forth, to carry out a particular function. In another aspect, the system can use a processor and computer-readable storage device to store instructions which, when executed by the processor, cause the processor to perform operations, a method or other specific actions. The basic components and appropriate variations can be modified depending on the type of device, such as whether the device 300 is a small, handheld computing device, a desktop computer, or a computer server. When the processor 320 executes instructions to perform "operations", the processor 320 can perform the operations directly and/or facilitate, direct, or cooperate with another device or component to perform the operations.

Although the exemplary embodiment(s) described herein employs the hard disk 360, other types of computer-readable storage devices which can store data that are accessible by a computer, such as magnetic cassettes, flash memory cards, digital versatile disks (DVDs), cartridges, random access memories (RAMs) 350, read only memory (ROM) 340, a cable containing a bit stream and the like, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 300, an input device 390 represents any number of input mechanisms, such as a microphone for speech, a touch-sensitive screen for gesture or graphical input, keyboard, mouse, motion input, speech and so forth. An output device 370 can also be one or more of a number of output mechanisms known to those of skill in the art. In some instances, multimodal systems enable a user to provide multiple types of input to communicate with the computing device 300. The communications interface 380 generally governs and manages the user input and system output. There is no restriction on operating on any particular hardware arrangement and therefore the basic hardware depicted may easily be substituted for improved hardware or firmware arrangements as they are developed.

For clarity of explanation, the illustrative system embodiment is presented as including individual functional blocks including functional blocks labeled as a "processor" or processor 320. The functions these blocks represent may be provided through the use of either shared or dedicated hardware, including, but not limited to, hardware capable of executing software and hardware, such as a processor 320, that is purpose-built to operate as an equivalent to software executing on a general purpose processor. For example the functions of one or more processors presented in FIG. 3 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 340 for storing software performing the operations described below, and random access memory (RAM) 350 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 300 shown in FIG. 3 can practice all or part of the recited methods, can be a part of the recited systems, and/or can operate according to instructions in the recited tangible computer-readable storage devices. Such logical operations can be implemented as modules configured to control the processor 320 to perform particular functions according to the programming of the module. For example, FIG. 3 illustrates three modules Mod1 362, Mod2 364 and Mod3 366 which are modules configured to control the processor 320. These modules may be stored on the storage device 360 and loaded into RAM 350 or memory 330 at runtime or may be stored in other computer-readable memory locations.

One or more parts of the example computing device 300, up to and including the entire computing device 300, can be virtualized. For example, a virtual processor can be a software object that executes according to a particular instruction set, even when a physical processor of the same type as the virtual processor is unavailable. A virtualization layer or a virtual "host" can enable virtualized components of one or more different computing devices or device types by translating virtualized operations to actual operations. Ultimately however, virtualized hardware of every type is implemented or executed by some underlying physical hardware. Thus, a virtualization compute layer can operate on top of a physical compute layer. The virtualization compute layer can include one or more of a virtual machine, an overlay network, a hypervisor, virtual switching, and any other virtualization application.

The processor 320 can include all types of processors disclosed herein, including a virtual processor. However, when referring to a virtual processor, the processor 320 includes the software components associated with executing the virtual processor in a virtualization layer and underlying hardware necessary to execute the virtualization layer. The system 300 can include a physical or virtual processor 320 that receive instructions stored in a computer-readable storage device, which cause the processor 320 to perform certain operations. When referring to a virtual processor 320, the system also includes the underlying physical hardware executing the virtual processor 320.

Embodiments within the scope of the present disclosure may also include tangible and/or non-transitory computer-readable storage devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein apply generally to climate data, but can also be applied to other non-climate data sets. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

We claim:

1. A system for providing a climate data analytic services application programming interface distribution package, the system comprising:
    a processor;
    a non-transitory computer-readable storage medium storing instructions which, when executed by the processor, cause the processor to provide:
        a climate data analytic services application programming interface library that enables software applications running on a client device to invoke capabilities of a climate data analytic service;
        a command-line interface that provides a means of interacting with a climate data analytic service by issuing commands directly to the system's server interface;
        sample programs that call on the capabilities of an application programming interface library to be used as templates for construction of new client applications;
        test utilities that evaluate the robustness and performance of an installed client-side application programming interface environment;
        build utilities that install the application programming interface library and create the client-side run-time environment required by the services application programming interface library;
        service integration utilities that provide templates to be used to build an interface to one of a new service or legacy system, and a collection of pre-built integration interfaces for commonly used systems; and
        documentation describing an organization of the distribution package and how an end-user installs and uses the climate data analytic services application programming interface.

2. The system of claim 1, wherein the application programming interface library comprises files containing a source code necessary to build and execute client-side applications.

3. The system of claim 1, wherein the build utilities comprise a plurality of tools.

4. The system of claim 1, wherein the sample programs further comprise:
    an application that demonstrates the use of the climate data analytic services application programming interface to automate data gathering from a climate data analytics service using the basic utilities of the service;
    an application that demonstrates the use of the climate data analytic services application programming interface to automate data gathering from a climate data analytics service using an extended utilities of the service; and
    an application that demonstrates the use of the climate data analytic services application programming interface to store a data object in a persistence service then add metadata, search, and download an object using a basic utilities of a persistence service.

5. The system of claim 1, wherein the test utilities further comprise:
    a MERRA Analytic Services robustness test that exercises a basic utility methods of the service over various combinations of MERRA collections and variables;
    a persistence service robustness test that exercises the basic utility methods of the service with various combinations of operations; and
    a comprehensive robustness test that exercises all methods of all services supported by the climate data analytic services application programming interface.

6. The system of claim 1, further comprising a service integration library further comprises:
    an adapter module that maps the application programming interface's programming library utilities to specific capabilities of a new service or legacy system; and
    a representational state transfer module that communicatively links the application programming interface to a new service or legacy system Web service interface.

7. The system of claim 6, wherein the adapter module maps service requests based on International Organization for Standards Open Archival Information System Reference Model data flow categories comprising:
    ingest capabilities that input data objects to a service;
    query capabilities that retrieve metadata relating to data objects in a service;
    order capabilities that dynamically create data objects in a service;
    download capabilities that retrieve data objects from a service;
    execute capabilities that initiate service-definable operations; and
    status capabilities that check the progress of an order operation.

8. The system of claim 6, wherein the adapter and representational state transfer modules further comprise general templates.

9. The system of claim 1, wherein the service integration utilities comprise specific adaptor modules for an Earth System Grid Federation, Open-Source Project for a Network Data Access Protocol services, and Open Geographic Consortium Web Processing Service services.

10. The system of claim 1, wherein the documentation further comprises a readme file that contains detailed configuration, deployment, and testing instructions.

11. A method comprising:

providing, via a processor of a computing device, a climate data analytic services application programming interface library that enables software applications running on a client device to invoke capabilities of a climate data analytic service;

providing a command-line interface that provides a means of interacting with a climate data analytic service by issuing commands directly to a system's server interface;

providing sample programs that call on the capabilities of the application programming interface library to be used as templates for a construction of new client applications;

providing test utilities that evaluate the robustness and performance of an installed client-side application programming interface environment;

providing build utilities that install the application programming interface library and create a client-side runtime environment required by the application programming interface library;

providing service integration utilities that provide templates to be used to build an interface to one of a new service or legacy system, and a collection of pre-built integration interfaces for commonly used systems; and providing documentation describing an organization of a distribution package and how an end-user installs and uses the climate data analytic services application programming interface.

\* \* \* \* \*